(12) United States Patent
Thiel et al.

(10) Patent No.: US 12,186,820 B2
(45) Date of Patent: Jan. 7, 2025

(54) CONTACT MATRIX FOR GROUNDING A CERAMIC COMPONENT DURING ELECTRICAL DISCHARGE MACHINING

(71) Applicant: General Electric Company, Schenectady, NY (US)

(72) Inventors: Jacob Gregory Thiel, Springboro, OH (US); Yuefeng Luo, Liberty Township, OH (US); Allison Michelle Hanna, Asheville, NC (US); Caleb Dewayne Myers, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 1017 days.

(21) Appl. No.: 17/142,323

(22) Filed: Jan. 6, 2021

(65) Prior Publication Data

US 2022/0212276 A1    Jul. 7, 2022

(51) Int. Cl.
   *B23H 1/04*    (2006.01)
(52) U.S. Cl.
   CPC ..................................... *B23H 1/04* (2013.01)
(58) Field of Classification Search
   CPC . B23H 1/04; B23H 1/028; B23H 9/10; B23H 7/265; B23H 9/14; B23H 7/36; B23H 7/30
   USPC .......................................... 219/69.17, 69.15
   See application file for complete search history.

(56) References Cited

U.S. PATENT DOCUMENTS

| | | |
|---|---|---|
| 5,167,903 A | 12/1992 | Anderson |
| 6,509,539 B2 | 1/2003 | Fischer et al. |
| 7,214,901 B1 | 5/2007 | Ball et al. |
| 7,220,934 B2 | 5/2007 | Paauwe et al. |
| 7,339,777 B2 | 3/2008 | Barnard et al. |
| 8,168,912 B1 | 5/2012 | Liang |
| 8,985,564 B2 | 3/2015 | Stanifer et al. |
| 9,849,528 B2 | 12/2017 | Luo et al. |
| 10,106,935 B1 | 10/2018 | Klein |
| 10,537,935 B2 | 1/2020 | Rollinger et al. |
| 11,511,361 B2 | 11/2022 | Ahmed et al. |
| 2007/0256939 A1 | 11/2007 | Wei et al. |
| 2007/0284339 A1 | 12/2007 | Moore et al. |
| 2017/0175534 A1 | 6/2017 | Ferber et al. |
| 2017/0298777 A1 | 10/2017 | Lamusga |
| 2017/0341173 A1 | 11/2017 | Lilburne et al. |
| 2018/0291566 A1* | 10/2018 | Klein ........................ H01R 4/30 |
| 2019/0084890 A1 | 3/2019 | Weaver et al. |
| 2019/0143431 A1* | 5/2019 | Luo ..................... B23F 23/1212 |
| | | 219/69.15 |

FOREIGN PATENT DOCUMENTS

CN            107363350 A       11/2017

* cited by examiner

*Primary Examiner* — Phuong T Nguyen
(74) *Attorney, Agent, or Firm* — Dority & Manning, P.A.

(57) ABSTRACT

Methods of Electrical Discharge Machining (EDM) ceramic components are provided. In one aspect, a method includes electrical discharge machining a ceramic component, such as a Ceramic Matrix Composite (CMC) component. The ceramic component is electrical discharge machined while a contact matrix is positioned so that electrically conductive compliant and pressurized contacts of the contact matrix engage the ceramic component and so that an electrically conductive member of the contact matrix is in electrical conduction to a grounding structure.

19 Claims, 8 Drawing Sheets

CONTACT MATRIX FOR GROUNDING A CERAMIC COMPONENT DURING ELECTRICAL DISCHARGE MACHINING

FIELD

The present subject matter relates generally to electrical discharge machining ceramic components, such as ceramic matrix composite components.

BACKGROUND

Electrical Discharge Machining (EDM) is sometimes used to machine features in ceramic components, such as Ceramic Matrix Composite (CMC) components for gas turbine engines. For example, EDM can be used to drill cooling holes in CMC high-pressure turbine nozzles. One challenge with drilling features in CMC components via EDM, or ceramic components generally, is that such components are not typically electrically grounded in an efficient and/or effective manner. Typically, a metallic fixture or other metallic structure is used to electrically ground CMC components during EDM. Due to the surface irregularity of the metallic structure and the CMC component, many times only a limited number of contact points are made between the rigid CMC component and the rigid metallic grounding structure. Due to the surface potential or Schottky barrier, the electrical resistance at these contact points can be considerable, which creates bottlenecks of electrical current that obstructs or even fails the electrical grounding process by point overheating and/or arcing. Inefficient and/or ineffective electrical grounding of a CMC component during EDM is undesirable. For instance, ineffective electrical grounding can result in pitting at the grounding contact points.

Accordingly, methods that address one or more of the challenges noted above would be useful.

BRIEF DESCRIPTION

Aspects and advantages of the invention will be set forth in part in the following description, or may be obvious from the description, or may be learned through practice of the invention.

In one aspect, a method is provided. The method includes electrical discharge machining a ceramic component while a contact matrix is positioned so that electrically conductive contacts of the contact matrix engage the ceramic component and so that an electrically conductive member of the contact matrix is in electrical conduction to a grounding structure.

In another aspect, a contact matrix for facilitating electrical grounding of a ceramic component undergoing electrical discharge machining. The contact matrix includes an electrically conductive backbone. The contact matrix also includes compliant and pressurized electrically conductive contacts extending outward from the electrically conductive backbone. At least some of the compliant and pressurized electrically conductive contacts are biased into engagement with the ceramic component so that the at least some of the compliant and pressurized electrically conductive contacts are in electrical conduction to the ceramic component. Moreover, at least one of the electrically conductive backbone and at least one of the compliant and pressurized electrically conductive contacts are in electrical conduction to a grounding structure.

In another exemplary aspect, a method is provided. The method includes positioning a contact matrix between a ceramic matrix composite component and a grounding structure. The contact matrix has an electrically conductive backbone and compliant and pressurized electrically conductive contacts extending outward from the electrically conductive backbone. The method also includes electrical discharge machining the ceramic matrix composite component while the contact matrix is positioned therebetween so that the compliant and pressurized electrically conductive contacts are biased into pressurized engagement with the ceramic matrix composite component and so that the electrically conductive backbone or at least one of the compliant and pressurized electrically conductive contacts is in electrical conduction to the grounding structure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
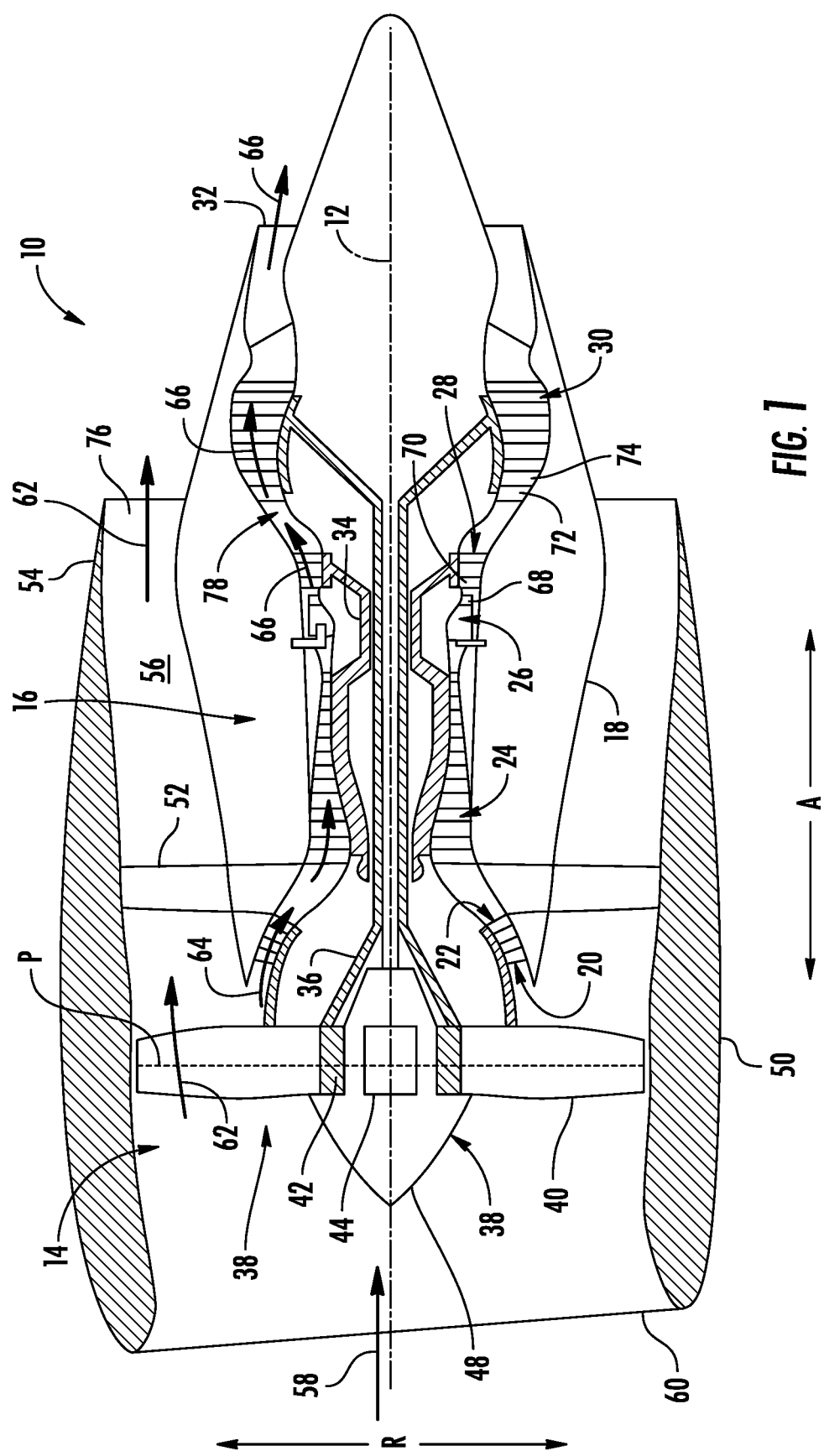
FIG. 1 is a schematic cross-sectional view of an exemplary gas turbine engine according to various embodiments of the present subject matter.

Repeat use of reference characters in the present specification and drawings is intended to represent the same or analogous features or elements.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

As used herein, a "ceramic component" is a component formed of ceramic-based materials. Ceramic-based materials encompass both homogeneous ceramic materials as well as ceramic composite materials, such as Ceramic Matrix Composite (CMC) materials. CMC materials generally include a ceramic fiber reinforcement material embedded in a ceramic matrix material. As one example, the ceramic fiber reinforcement material and the ceramic matrix material of a CMC material can both be formed of SiC. SiC/SiC CMC components are particularly suitable for high-temperature applications, such as for high-temperature components of aviation gas turbine engines and land-based gas turbine engines used in the power generation industry. SiC fibers can also been used as a reinforcement material for a variety of other ceramic matrix materials, such as, without limitation, titanium carbide (TiC), silicon nitride (Si3N4), and alumina (Al2O3).

Aspects of the present disclosure are directed to methods of Electrical Discharge Machining (EDM) ceramic components, such as CMC components for gas turbine engines. Particularly, disclosed herein is a contact matrix or matrix of electrical contacts that can be positioned between a CMC component and a grounding structure to facilitate efficient and effective electrical grounding of the CMC component during EDM of the CMC component. The contact matrix includes a plurality of contacts that contact or otherwise engage the CMC component. The electrically conductive contacts can be coupled with a backbone. The contacts can be directly connected or attached to the backbone or they can be coupled thereto, e.g., by means of a pin housing and/or a spring. The backbone can be electrically conductive and can be rigid or flexible. Further, the backbone can be straight or can be contoured complementary to the CMC component and/or the grounding structure.

Further, the contacts can be compliant and pressurized contacts such that they engage the rigid CMC component with spring-like action. In this way, numerous contacts can be biased into engagement with the CMC component and/or the grounding structure to accommodate the irregularity of the rigid surfaces. As one example, the compliant and pressurized contacts can be electrically conductive bristles. Each electrically conductive bristle can extend from a bristle stem to a bristle tip. The elasticity in a compressed bristle stem can exert contact pressure of the bristle tip to the rigid CMC surface. In this way, the bristles can maintain engagement with the rigid CMC component during EDM. As another example, the compliant and pressurized contacts can be electrically conductive spring-loaded pins. The spring-loaded pins can include an electrically conductive pin and a compressible spring. Compression of the spring behind the pin can exert contact pressure of the pin to the rigid CMC surface. The compressed spring maintains the pin into engagement with the rigid CMC component during EDM.

Notably, the contacts can provide pathways for electrical current to pass from the contact matrix to the CMC component or vice versa. Accordingly, the contacts are in electrical conduction to the CMC component when they are biased into engagement with the CMC component. The contact matrix can also be in electrical conduction to a grounding structure, such as a fixture of an EDM system. In this way, electrical current can be passed from the grounding structure to the contact matrix and then from the contact matrix to the CMC component during EDM. It is also possible for electrical current to be passed from the CMC component to the contact matrix and then from the contact matrix to the grounding structure.

Advantageously, the contact matrix can significantly increase the number of pathways in which the CMC component can be electrically grounded, which can lead to more efficient and effective electrical grounding of the CMC component during EDM. These numerous pathways increase flow capacity of electrical current to allow EDM at high power. With better electrical grounding, a smoother burn or sparking without contact overheat or arcing can be achieved during EDM, which can result in reduced cycle times and scrap and minimizes the risk of broken tool electrodes, among other benefits.

FIG. 1 provides a schematic cross-sectional view of a gas turbine engine in accordance with one example embodiment of the present subject matter. For the depicted embodiment of FIG. 1, the gas turbine engine is a high-bypass turbofan jet engine 10, referred to herein as "turbofan 10." As shown in FIG. 1, the turbofan 10 defines an axial direction A (extending parallel to a longitudinal centerline 12 provided for reference), a radial direction R, and a circumferential direction extending in a plane orthogonal to the axial direction A three hundred sixty degrees around the longitudinal centerline 12.

The turbofan 10 includes a fan section 14 and a core turbine engine 16 disposed downstream from the fan section 14. The core turbine engine 16 includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

The fan section 14 includes a variable pitch fan 38 having a plurality of fan blades 40 coupled to a disk 42 in a spaced apart manner. As depicted, the fan blades 40 extend outward from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36.

Referring still to FIG. 1, the disk 42 is covered by a rotatable front nacelle 48 aerodynamically contoured to promote an airflow through the plurality of fan blades 40. Additionally, the fan section 14 includes an annular fan casing or outer nacelle 50 that circumferentially surrounds the fan 38 and/or at least a portion of the core turbine engine 16. The nacelle 50 may be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the annular core inlet 20 and into the LP compressor 22. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan 10 can be formed of a composite material. For example, components within hot gas path 78, such as components of combustion section 26, HP turbine 28, and/or LP turbine 30, can be formed of a CMC material, which is a non-metallic material having high temperature capability. For instance, turbine blades and turbine nozzles can be formed of CMC materials. Other components of turbine engine 10 also may be formed from CMC materials or other suitable composite materials.

Exemplary matrix materials for such CMC components can include silicon carbide, silicon, silica, alumina, or combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

Figure 2:
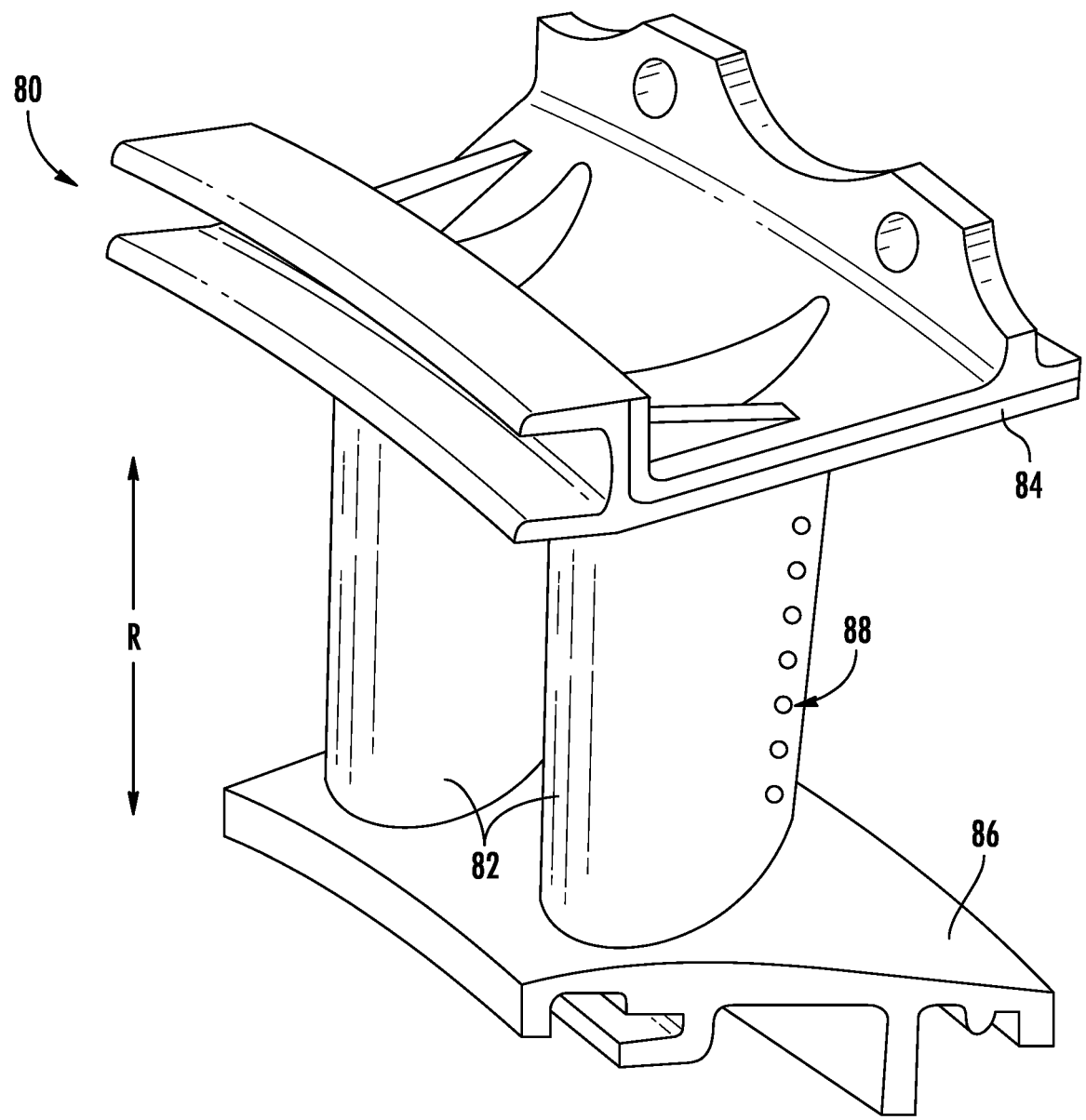
FIG. 2 provides a perspective view of a turbine nozzle segment according to an example embodiment of the present subject matter.

FIG. 2 provides a perspective view of a turbine nozzle segment 80 according to an exemplary embodiment of the present subject matter. For this embodiment, the turbine nozzle segment 80 is formed of a CMC material, such as one or more of the CMC materials noted above. The turbine nozzle segment 80 is one of a number of nozzle segments that when connected together form an annular nozzle assembly of a gas turbine engine, such as e.g., the turbofan 10 of FIG. 1. The nozzle segment 80 includes vanes 82, such as e.g., stator vanes 68 of the turbofan 10 of FIG. 1. Each vane 82 or airfoil and extends between an outer and inner band 84, 86. Notably, the vanes 82 define a plurality of cooling holes 88. Cooling holes 88 provide film cooling to improve the thermal capability of the vanes 82. The cooling holes 88 can be fluidly connected to one or more fluid passageways that extend internally through the vanes 82. The cooling holes 88 as well as other features of the turbine nozzle segment 80 can be machined via an EDM process.

Figure 3:
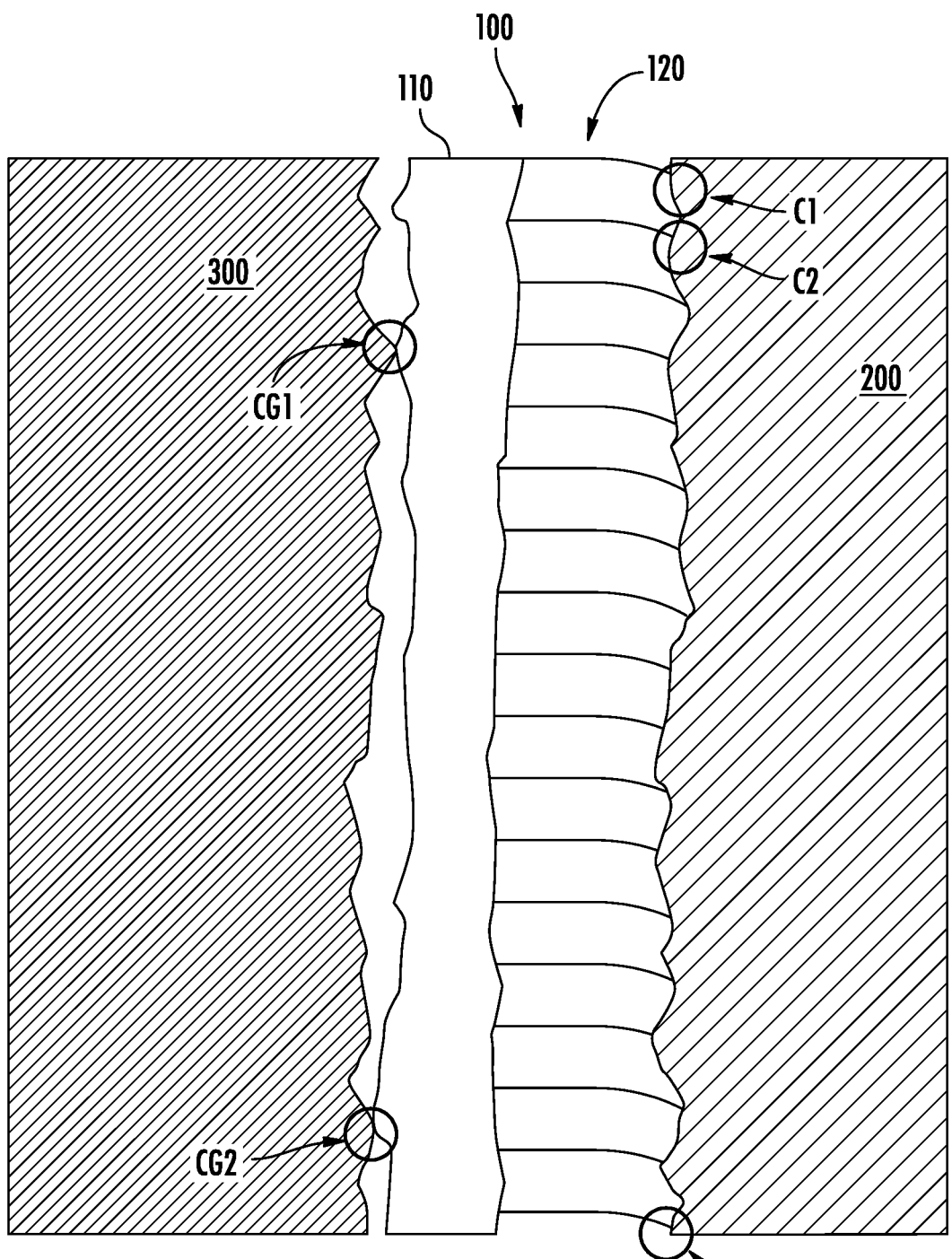
FIG. 3 provides a schematic cross-sectional view of a CMC component undergoing electrical discharge machining and also depicts a contact matrix positioned engaged with the CMC component for providing electrical grounding according to an example embodiment of the present subject matter.

FIG. 3 provides a schematic cross-sectional view of a CMC component 200 undergoing EDM. For instance, the CMC component 200 can be the turbine nozzle segment 80 of FIG. 2 and the feature being machined into the CMC component 200 via EDM can be one of the cooling holes 88. It will be appreciated that other CMC components, or more generally ceramic components, can be machined via EDM using the inventive concepts disclosed herein.

Generally, to machine a feature into the CMC component 200, an electrode tool of an EDM system is guided proximate to the CMC component 200 submerged in a dielectric fluid. A pulse generator of the EDM system causes the voltage between the electrode tool and the CMC component 200 to increase, which ultimately causes electrical discharges or sparks that remove material from the CMC component 200. A series of rapidly recurring electrical discharges are made until the desired feature in the CMC component 200 is formed. For safe and effective EDM operation and handling of the CMC component 200, it is necessary to electrically ground the CMC component 200 during EDM for the efficient conduction of electrical current with minimum contact resistance. In accordance with the inventive aspects of the present subject matter, a contact matrix 100 is provided to facilitate efficient and effective grounding of the CMC component 200 during EDM.

As depicted in FIG. 3, the contact matrix 100 is positioned such that it engages the CMC component 200 and a grounding structure 300, e.g., to facilitate electrical grounding during the EDM process. The grounding structure 300 can be a metallic fixture operable to hold the CMC component 200 during EDM, for example. Generally, the contact matrix 100 decreases the electrical contact resistance or the Schottky barrier between the CMC component 200 and the grounding structure 300, which facilitates efficient and effective electrical conduction between the CMC component 200 and the grounding structure 300 during EDM.

The contact matrix 100 includes a backbone 110 and a plurality compliant and pressurized contacts 120. The backbone 110 and the compliant and pressurized contacts 120 are both formed of an electrically conductive material. The backbone 110 can be any suitable shape. For instance, the backbone 110 can have a rectangular shape as shown in FIG. 3. In some embodiments, the backbone 110 can have a helical shape. Accordingly, the backbone 110 can be a helical wire rope in some embodiments. In some embodiments, the backbone 110 can be a rigid electrically conductive member. In other embodiments, the backbone 110 can be a flexible electrically conductive member. Further, in some embodiments, the backbone 110 can be a straight member. In other embodiments, the backbone 110 can be a curved or arcuate member.

For the depicted embodiment of FIG. 3, the electrically conductive backbone 110 is the electrically conductive member of the contact matrix 100 that engages the grounding structure 300. As this is a conductive-to-conductive material interface (e.g., metal-to-metal), the Schottky barrier is not present and electrical current can flow with low contact resistance from the backbone 110 to the grounding structure 300 even despite the limited number of contact points CG1, CG2 between the irregular surface of the backbone 110 and the irregular surface of the grounding structure 300. In other embodiments, as will be explained further herein, the electrically conductive member of the contact matrix 100 that engages the grounding structure 300 can be other suitable members, such as a set of the electrically conductive contacts 120.

Each of the electrically conductive contacts 120 are connected to and extend outward from the backbone 110. In this way, the backbone 110 acts as the central hub of the contact matrix 100. The contact matrix 100 can have any suitable number of contacts 120. Accordingly, the contacts 120 engaged with the CMC component 200 can multiply the capacity of surface current flow of the CMC component 200 by N times, wherein N is the number of contacts of the contact matrix 100 engaging the CMC component 200. For instance, as shown in FIG. 3, each contact 120 engaging the irregular surface of the CMC component 200 creates an electrical conduction pathway or contact point between the CMC component 200 and the contact matrix 100. As depicted, a first contact 120 engaging the CMC component 200 creates a first contact point C1 or first conduction pathway, a second contact 120 engaging the CMC component 200 creates a second contact point C2 or second conduction pathway, and so on to the Nth contact 120 that engages the CMC component 200 to create an Nth contact point CN or Nth conduction pathway between the CMC component 200 and the contact matrix 100.

For this embodiment, the contacts 120 are compliant in that they may each plastically and/or elastically deform or bend when engaged with a component or structure. For the depicted embodiment of FIG. 3, the contacts 120 include a plurality of electrically conductive bristles. The bristles can be steel bristles, for example. As shown, the contacts 120, or bristles in this embodiment, deform or bend when they engage the CMC component 200. The deformation of the bristles causes the bristles to engage the CMC component 200 with spring-like action such that the bristles are biased into contact with the CMC component 200. Stated another way, the contacts 120 apply pressure to the CMC component 200. Contact pressure is present between the bristle tips and CMC surface. This ensures engagement of the contacts 120 with the surface of the CMC component 200 during EDM. With the contact matrix 100 engaged in electrical conduction to the grounding structure 300 and the contacts 120 engaged with the CMC component 200 during EDM, electrical current can effectively pass from the grounding structure 300 to the contact matrix 100 and then to the CMC component 200 via the contacts 120 or vice versa. It is typical for the electrical current to flow from the grounding structure 300 to the CMC component 200 via the contact matrix 100.

Figure 4:
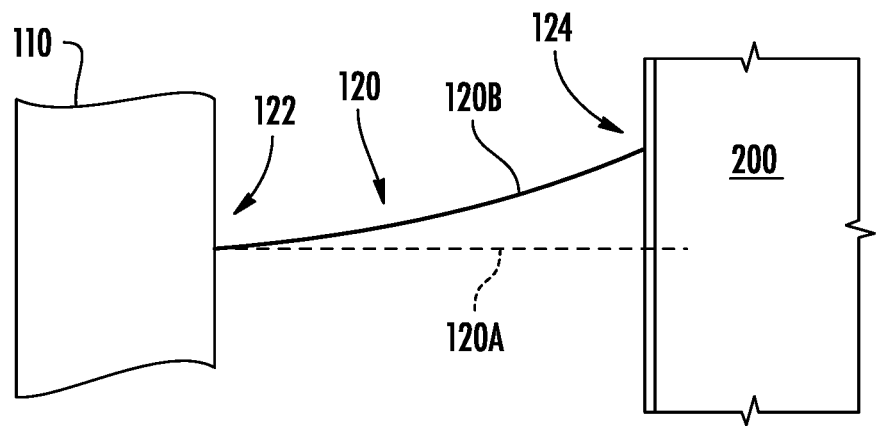
FIG. 4 provides a close-up schematic view of one contact of the contact matrix of FIG. 3 engaging the CMC component.

FIG. 4 provides a close-up schematic view of one contact 120 of the contact matrix 100 of FIG. 3 engaging the CMC component 200. As shown, the contact 120 has a stem or first end 122 and a tip or second end 124. The first end 122 is connected to the backbone 110 of the contact matrix 100 and the second end 124 is not connected to the backbone 110. When the contact matrix 100 is moved into position, e.g., between the CMC component 200 and the grounding structure 300, the contact 120 engages the CMC component 200. Consequently, the contact 120 transitions from a relaxed state (represented by the dashed line 120A) to an engaged state (represented by the solid line 120B). The contact matrix 100 is positioned such that the distance between the backbone 110 and the CMC component 200 is less than the length that the contact 120 extends outward from the backbone 110 in its relaxed state. Accordingly, when the contact 120 engages the CMC component 200 and deforms, the contact 120 engages the CMC component 200 with spring-like action, which provides contact pressure for contact reliability.

Particularly, in the engaged state, the contact 120 can undergo both plastic and elastic deformation. For instance, a portion of the contact 120 extending from the first end 122 to some point outward of the first end 122 may plastically deform (i.e., permanent deformation) and a portion from the point outward to the second end 124 may elastically deform (i.e., non-permanent deformation). The portion of the contact 120 that elastically deforms may apply pressure or a force on the CMC component 200, which thus biases the contact 120 into engagement with the CMC component 200. The biased engagement of the contact 120 of FIG. 4 with the CMC component 200 maintains the contact 120 and the CMC component 200 in electrical conduction during EDM. Thus, a reliable electrical conduction pathway for electricity to flow from the contact matrix 100 to the CMC component 200 is provided during EDM. It will be appreciated that all or some of the other contacts 120 of the contact matrix 100 of FIG. 3 can engage the CMC component 200 in a similar manner as described above with respect to the contact 120 of FIG. 4.

Figure 5:
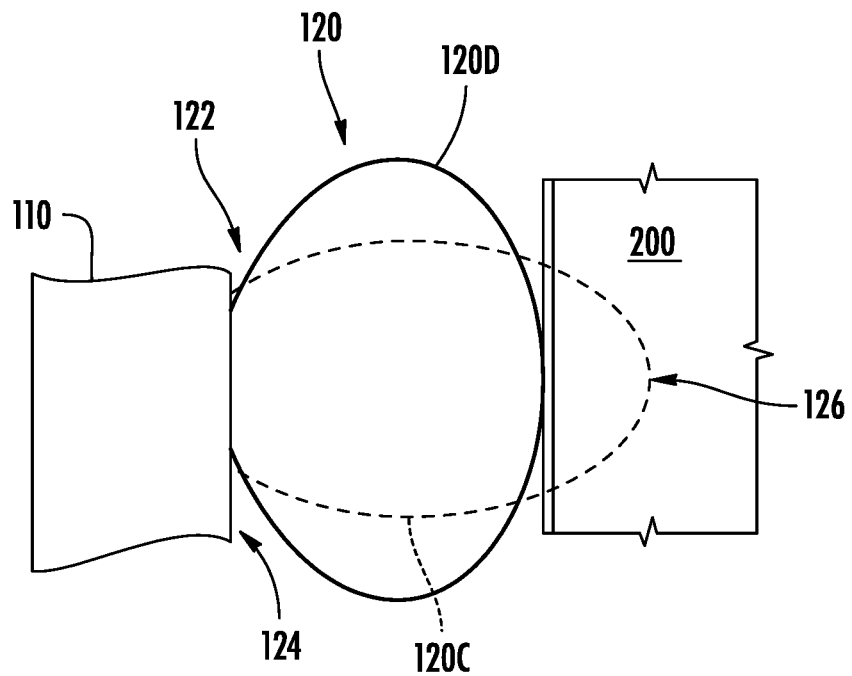
FIG. 5 provides a close-up schematic view of an alternative configuration of a contact of a contact matrix engaging a CMC component.

In some embodiments, the contacts 120 of the contact matrix 100 can be configured in a different manner than those shown in FIGS. 3 and 4. For instance, one or more of the contacts 120 can be configured as shown in FIG. 5. In FIG. 5, the electrically conductive contact 120 has a first end 122 and a second end 124. For this embodiment, the first end 122 and the second end 124 are connected to the backbone 110 of the contact matrix 100. When the contact matrix 100 is moved into position, e.g., between the CMC component 200 and the grounding structure 300, the contact 120 engages the CMC component 200. As a result, the contact 120 transitions from a relaxed state (represented by the dashed line 120C) to an engaged and compressed state (represented by the solid line 120D). The contact matrix 100 is positioned such that the distance between the backbone 110 and the CMC component 200 is less than the length that the contact 120 extends outward from the backbone 110 to its apex 126. Accordingly, when the contact 120 engages the CMC component 200 and deforms, the contact 120 engages the CMC component 200 with spring-like action, which provides contact pressure for contact reliability.

Figure 6:
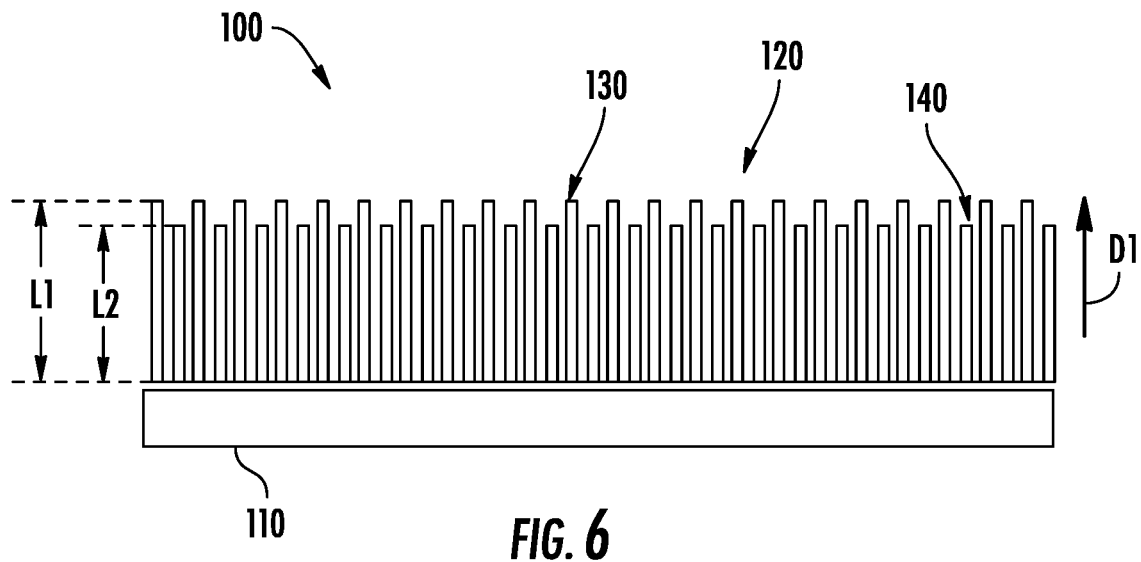
FIG. 6 provides a schematic view of another example configuration of a contact matrix according to an example embodiment of the present subject matter.

FIG. 6 provides a schematic view of another example configuration of the contact matrix 100. For this embodiment, the plurality of electrically conductive contacts 120 include a first set 130 of electrically conductive compliant contacts and a second set 140 of electrically conductive compliant contacts. The compliant contacts of the first set 130 alternate with the compliant contacts of the second set 140 in this example embodiment. As shown, the electrically conductive compliant contacts of the first set 130 extend outward from the backbone 110 a first predetermined length L1 in a first direction D1. The electrically conductive compliant contacts of the second set 140 extend outward from the backbone 110 a second predetermined length L2 in the first direction D1. Notably, the first predetermined length L1 is greater than the second predetermined length L2. In other embodiments, the plurality of electrically conductive contacts 120 can include more than two sets of compliant contacts having predetermined lengths. By varying the length of the compliant contacts of the sets, the spring action applied to the CMC component 200 by the compliant contacts can be varied. Further, varying the length of the compliant contacts of the sets allows for additional margin in positioning the contact matrix 100 relative to a CMC component (and in some instances, a metallic grounding structure).

Figure 7:
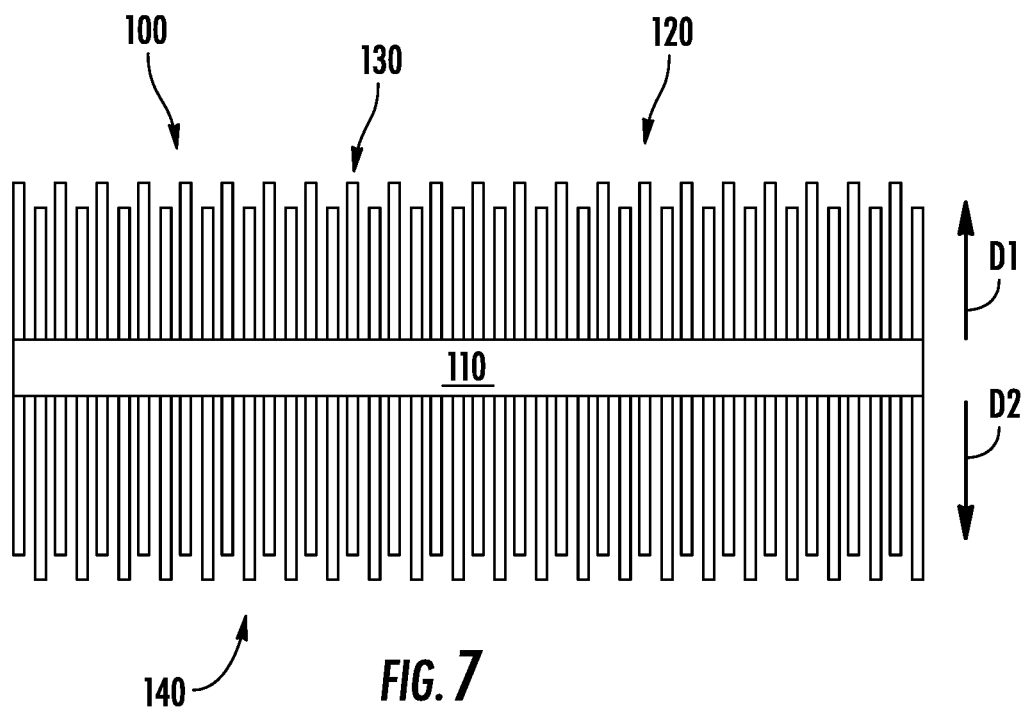
FIG. 7 provides a schematic view of another example configuration of a contact matrix according to an example embodiment of the present subject matter.
Figure 8:
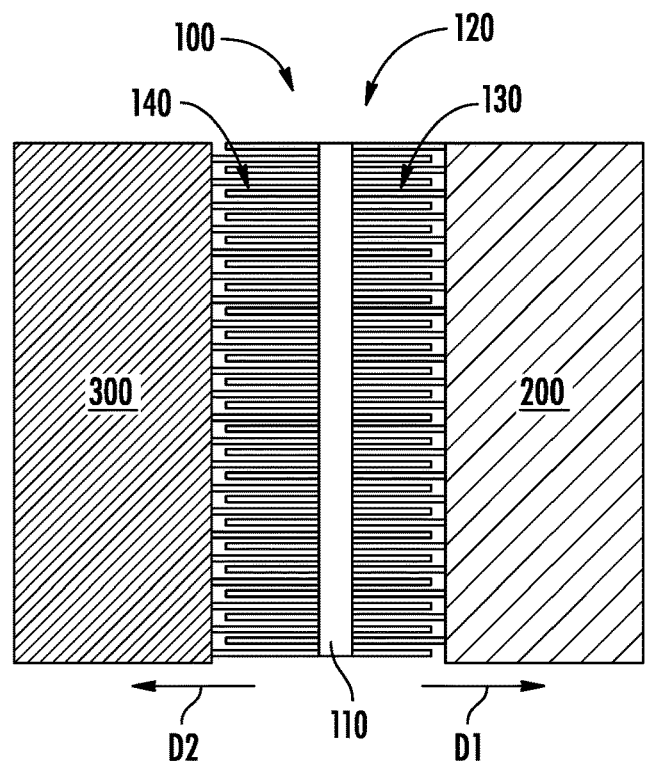
FIG. 8 provides a schematic cross-sectional view of a CMC component undergoing electrical discharge machining and also depicts the contact matrix of FIG. 7 positioned engaged with the CMC component for providing electrical grounding.

With reference now to FIGS. 7 and 8, another example configuration of the contact matrix 100 is provided. For this embodiment, the plurality of electrically conductive contacts 120 include a first set 130 of electrically conductive compliant contacts and a second set 140 of electrically conductive compliant contacts. The compliant contacts of the first set 130 extend from the backbone 110 along a first direction D1 and engage the CMC component 200, e.g., as shown in FIG. 8. The compliant contacts of the second set 140 extend from the backbone 110 along a second direction D2 and engage the grounding structure 300, e.g., as shown in FIG. 8. Accordingly, for this embodiment, the electrically conductive member of the contact matrix 100 that is in electrical conduction to the grounding structure 300 is the second set 140 of compliant contacts. In some embodiments, the second direction D2 is opposite the first direction D1. In other embodiments, the second direction D2 is not opposite the first direction D1.

As shown, the first and second sets 130, 140 of compliant contacts can have different predetermined lengths similar to the embodiment shown in FIG. 6. However, it will be appreciated that the compliant contacts of the first and second sets 130, 140 of the embodiment of FIGS. 7 and 8 can have all the same length or can have compliant contacts having different lengths randomly arranged with respect to the backbone 110.

Figure 9:
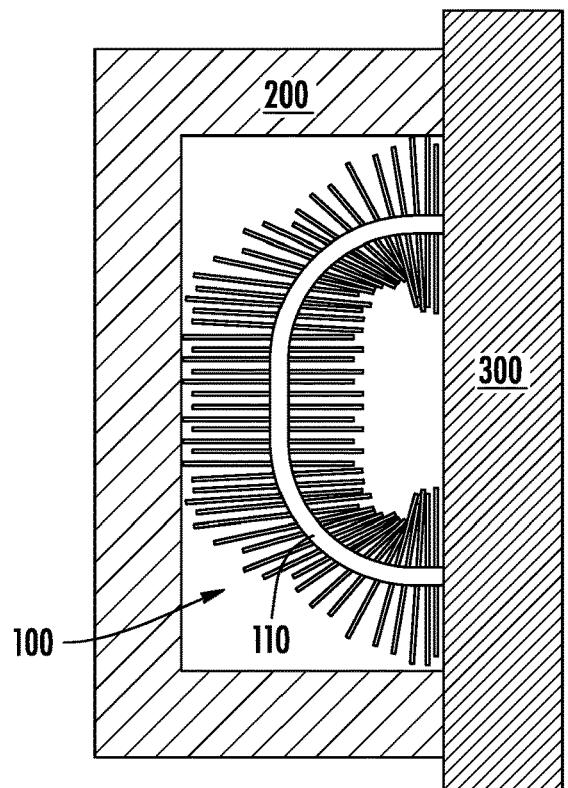
FIG. 9 provides a schematic view of another example configuration of a contact matrix according to an example embodiment of the present subject matter.

FIG. 9 provides a schematic view of another example configuration of the contact matrix 100. For this embodiment, the backbone 110 is curved or contoured. In this manner, the contacts 120 can contour to the surface or surfaces of the CMC component 200 and/or the grounding structure 300. This can provide a greater surface area of contact, which can ultimately effectively ground the CMC component 200 during EDM. The backbone 110 can be contoured to any suitable shape. In some embodiments, the backbone 110 is flexible such that the contact matrix 100 can be manipulated relative to the CMC component 200 and/or grounding structure 300. In other embodiments, the backbone 110 is preformed into the desired contour shape and is rigid.

Figure 10:
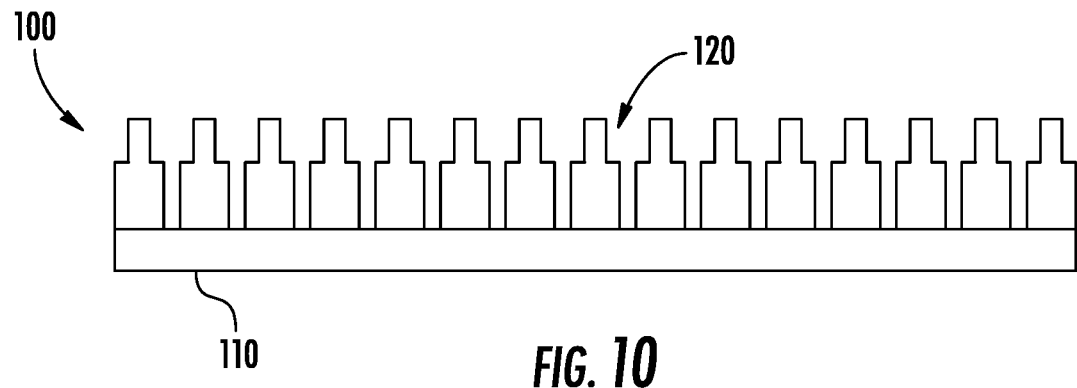
FIG. 10 provides a schematic view of another example configuration of a contact matrix according to an example embodiment of the present subject matter.
Figure 11:
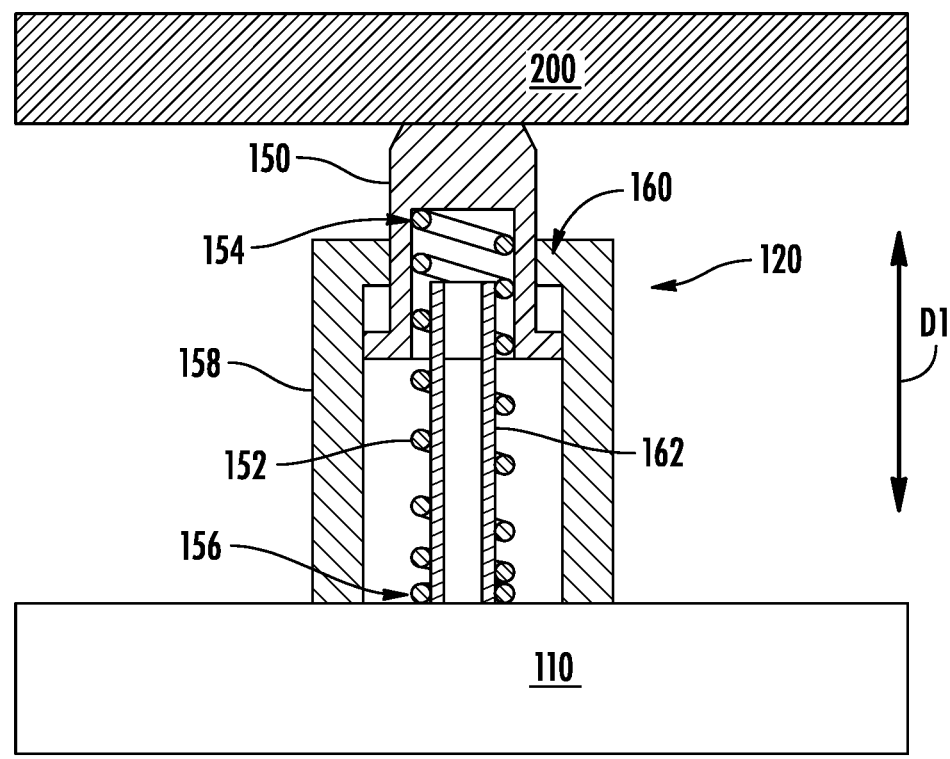
FIG. 11 provides a close-up schematic view of one contact of the contact matrix of FIG. 10 engaging a CMC component.

With reference now to FIGS. 10 and 11, FIG. 10 provides a schematic view of another example configuration of the contact matrix 100. FIG. 11 provides a close-up view of one of the contacts 120 of the contact matrix 100 of FIG. 10. For this embodiment, the plurality of electrically conductive contacts 120 are spring-loaded pins. As will be explained below, each spring-loaded pin includes an electrically conductive pin and a spring connected thereto. The spring of a given spring-loaded pin provides the compliance to account for the surface irregularity of the CMC surface. The spring also provides the contact pressure for maintaining the pin in contact with the irregular and rigid CMC surface for contact reliability.

As shown best in FIG. 11, the depicted contact 120, or electrically conductive pin 150 in this example embodiment, is connected with a spring 152. The spring 152 extends between a first end 154 and a second end 156. The pin 150 is connected with the spring 152 at its first end 154. Particularly, the first end 154 of the spring 152 is received within a recess defined by the pin 150. The pin 150 can be any suitable shape. Further, the pin 150 and the spring 152 are enclosed within a housing 158. The housing 158 can be formed of an electrically conductive material. The housing 158 can be connected to or formed integrally with the backbone 110. The spring 152 can contact or sit relatively flush with the base of the housing 158 or the backbone 110 at its second end 156. The housing 158 includes one or more stops 160 that retain the pin 150 relative to the housing 158. The spring 152 can be coupled with a post 162. The post 162 can assist in maintaining the orientation of the spring 152 and the pin 150. Each contact 120 in the depicted embodiment of FIGS. 10 and 11 can be configured in the same manner shown in FIG. 11.

Notably, for this embodiment, the pin 150 is movable along a first direction D1. Particularly, when the pin 150 is not engaged with a surface of the CMC component 200 (or in some instances a metallic grounding structure), the spring 152 is in a relaxed state. When the contact matrix 100 is moved into position such that the pin 150 engages the CMC component 200, the CMC component 200 applies a force on the pin 150. The applied force on the pin 150 causes the spring 152 to compress, and consequently, the pin 150 is moved toward the backbone 110 of the contact matrix 100 along the first direction D1. When compressed, the spring 152 is in a compressed state. The spring 152 is shown in the compressed state in FIG. 11. When compressed, the pin 150 in turn exerts a force on the CMC component 200 as the spring 152 seeks to return to its relaxed state. Thus, the pin 150 is biased into engagement with the CMC component 200. With the contacts 120, or spring-loaded pins 150 in this embodiment, engaged with the CMC component 200 during EDM, electrical current can effectively pass from the grounding structure 300 to the contact matrix 100 and then to the CMC component 200 via the contacts 120. This facilitates efficient and effective grounding of the CMC component 200 during EDM.

Figure 12:
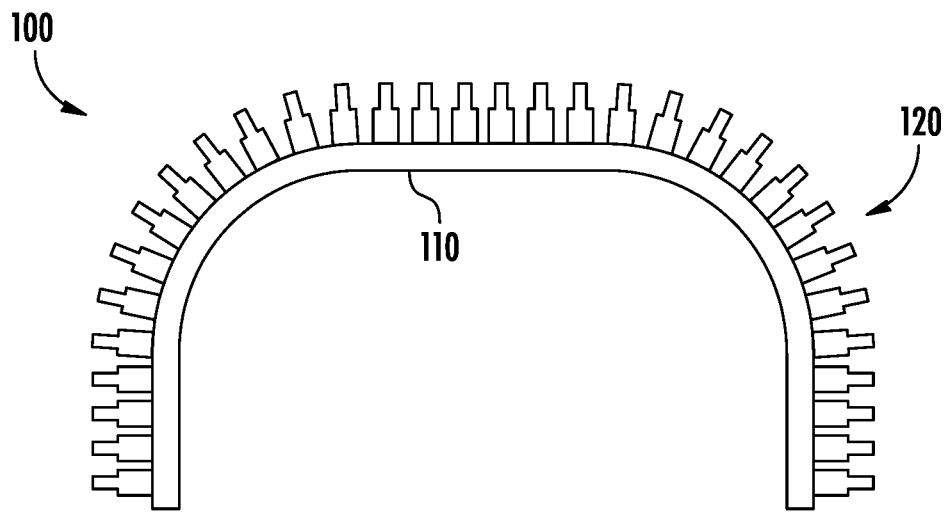
FIG. 12 provides a schematic view of another example configuration of a contact matrix according to an example embodiment of the present subject matter.

FIG. 12 provides a schematic view of another example configuration of the contact matrix 100. For this embodiment, like the embodiment of FIGS. 10 and 11, the plurality of electrically conductive contacts 120 are spring-loaded pins. However, in this embodiment, the backbone 110 is curved or contoured. In this manner, the contacts 120, or spring-loaded pins in this embodiment, can contour or be oriented to the surface or surfaces of the CMC component 200 and/or the grounding structure. This can provide a greater surface area of contact, which can ultimately effectively ground the CMC component 200 during EDM. The backbone 110 can be contoured to any suitable shape. In some embodiments, the backbone 110 is flexible such that the contact matrix 100 can be manipulated relative to the CMC component 200 and/or grounding structure. In other embodiments, the backbone 110 is preformed into the desired contour shape and is rigid.

In some embodiments, a contact matrix can include different types of compliant contacts. As one example, in some embodiments, a contact matrix can include both bristles and spring-loaded pins.

Figure 13:
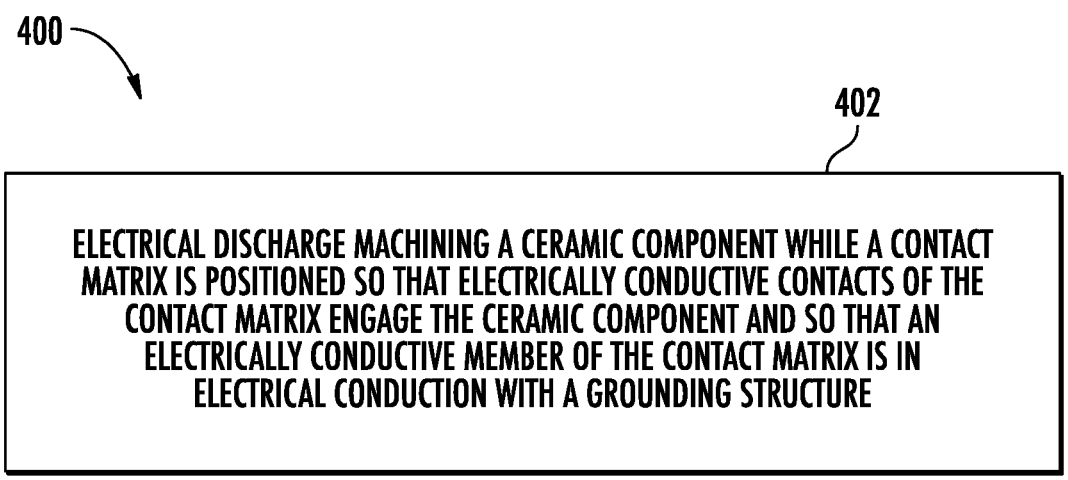
FIG. 13 provides a flow diagram of a method according to one example embodiment of the present subject matter.

FIG. 13 provides a flow diagram of a method (400) of electrical discharge machining a ceramic component according to one example embodiment of the present subject matter. For instance, the method (400) can be used to electrical discharge machine a CMC component, such as the CMC turbine nozzle segment of FIG. 2. Particularly, the method (400) can be used to electrical discharge machine a cooling hole in the CMC turbine nozzle segment of FIG. 2. The method (400) can be used to electrical discharge machine other ceramic components as well.

At (402), the method (400) includes electrical discharge machining a ceramic component while a contact matrix is positioned so that electrically conductive contacts of the contact matrix engage the ceramic component and so that an electrically conductive member of the contact matrix is in electrical conduction to a grounding structure. For instance, as shown in FIG. 3, the contact matrix 100 can be positioned between the ceramic component (the CMC component 200) and the grounding structure 300. The electrically conductive contacts 120 of the contact matrix 100 engage the ceramic component (the CMC component 200). The electrically conductive member of the contact matrix 100, which in FIG. 3 is the electrically conductive backbone 110, is in electrical conduction to the grounding structure 300. Specifically, the backbone 110 is contacting or otherwise engaged with the grounding structure 300. Accordingly, during EDM, electrical current can pass from the grounding structure 300 to the contact matrix 100 via the backbone 110. The electrical current can then pass from the backbone 110 to the electrically conductive contacts 120 of the contact matrix 100 and to the ceramic component (the CMC component 200). The contacts 120 engaged with the ceramic component provide many electrical grounding pathways for electrical current to flow to the CMC component during EDM, which as noted, can provide efficient and effective grounding of the ceramic component during EDM.

In some implementations of method (400), the electrically conductive contacts are compliant electrically conductive contacts that are biased into engagement with the ceramic component. For instance, in some implementations, the compliant electrically conductive contacts are bristles, e.g., as shown in the embodiments of FIGS. 3 through 9. In other implementations, the compliant electrically conductive compliant and pressurized contacts are spring-loaded pins, e.g., as shown in the embodiments of FIGS. 10 through 12.

In some implementations, the electrically conductive member of the contact matrix is one or more of the electrically conductive contacts. In such implementations, the one or more of the electrically conductive contacts engage the grounding structure. As one example, as shown in FIGS. 8 and 9, a first set 130 of the electrically conductive contacts extend from the backbone 110 and engage the ceramic component (the CMC component 200). In such implementations, the electrically conductive member of the contact matrix 100 is a second set 140 of the electrically conductive contacts. As depicted, the electrically conductive contacts of the second set 140 extend from the backbone 110 and engage the grounding structure 300. In some implementations, as shown in FIG. 8, the first set 130 of the electrically conductive contacts extend from the backbone 110 in a first direction D1 and the second set 140 of the electrically conductive contacts extend from the backbone 110 in a second direction D2 that is opposite the first direction D1.

In other implementations, the electrically conductive contacts are connected to and extend outward from a backbone. In such implementations, the electrically conductive member of the contact matrix is the backbone, e.g., as shown in FIG. 3.

In some implementations, the electrically conductive contacts are coupled with a rigid backbone. In some implementations, the electrically conductive contacts are coupled with a flexible backbone. In some implementations, the electrically conductive contacts are coupled with a backbone that is contoured complementary to the ceramic component, e.g., as shown in FIG. 9. In some implementations, the electrically conductive contacts are coupled with a backbone that is straight, e.g., as shown in FIGS. 3 and 8.

In some implementations, at least one of the electrically conductive contacts has a first end and a second end. In such implementations, the first end is connected to a backbone of the contact matrix and the second end is not connected to the backbone, e.g., as shown in FIG. 4. In other implementations, at least one of the electrically conductive contacts has a first end and a second end. In such implementations, the first end and the second end are connected to a backbone of the contact matrix, e.g., as shown in FIG. 5.

Further, in some implementations, the electrically conductive contacts include a first set of electrically conductive contacts and a second set of electrically conductive contacts. In such implementations, the electrically conductive contacts of the first set extend outward from a backbone a first predetermined length in a first direction and the electrically conductive contacts of the second set extend outward from the backbone a second predetermined length in the first direction, wherein the first predetermined length is greater than the second predetermined length. Such an implementation is depicted in the embodiment of FIG. 6.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. A method, comprising: electrical discharge machining a ceramic component while a contact matrix is positioned so that electrically conductive contacts of the contact matrix engage the ceramic component and so that an electrically conductive member of the contact matrix is in electrical conduction to a grounding structure.

2. The method of any preceding clause, wherein the ceramic component is a ceramic matrix composite component.

3. The method of any preceding clause, wherein the electrically conductive contacts are compliant and pressurized electrically conductive contacts that are biased into pressurized engagement with the ceramic component.

4. The method of any preceding clause, wherein the compliant and pressurized electrically conductive contacts are bristles.

5. The method of any preceding clause, wherein the compliant and pressurized electrically conductive contacts are spring-loaded pins.

6. The method of any preceding clause, wherein the electrically conductive member of the contact matrix is one or more of the electrically conductive contacts, and wherein the one or more of the electrically conductive contacts engage the grounding structure.

7. The method of any preceding clause, wherein the electrically conductive contacts are connected to and extend outward from a backbone, and wherein the electrically conductive member of the contact matrix is the backbone.

8. The method of any preceding clause, wherein a first set of the electrically conductive contacts extend from a backbone and engage the ceramic component.

9. The method of any preceding clause, wherein the electrically conductive member of the contact matrix is a second set of the electrically conductive contacts, and wherein the second set of the electrically conductive contacts extend from the backbone and engage the grounding structure.

10. The method of any preceding clause, wherein the first set of the electrically conductive contacts extend from the backbone in a first direction and the second set of the electrically conductive contacts extend from the backbone in a second direction that is opposite the first direction.

11. The method of any preceding clause, wherein the electrically conductive contacts are coupled with a backbone, and wherein the backbone is flexible.

12. The method of any preceding clause, wherein the electrically conductive contacts are coupled with a backbone, and wherein the backbone is contoured complementary to the ceramic component.

13. A contact matrix for facilitating electrical grounding of a ceramic component undergoing electrical discharge machining, the contact matrix comprising: an electrically conductive backbone; and compliant and pressurized electrically conductive contacts extending outward from the electrically conductive backbone, wherein at least some of the compliant and pressurized electrically conductive contacts are biased into engagement with the ceramic component so that the at least some of the compliant and pressurized electrically conductive contacts are in electrical conduction to the ceramic component, and wherein at least one of the electrically conductive backbone and at least one of the compliant and pressurized electrically conductive contacts are in electrical conduction to a grounding structure.

14. The contact matrix of any preceding clause, wherein the compliant and pressurized electrically conductive contacts are bristles.

15. The contact matrix of any preceding clause, wherein the compliant and pressurized electrically conductive contacts are spring-loaded pins.

16. The contact matrix of any preceding clause, wherein the ceramic component is a ceramic matrix composite component.

17. The contact matrix of any preceding clause, wherein the at least one of the compliant and pressurized electrically conductive contacts is in electrical conduction to the grounding structure.

18. The contact matrix of any preceding clause, wherein the electrically conductive backbone is in electrical conduction to the grounding structure.

19. The contact matrix of any preceding clause, wherein a first set of the compliant and pressurized electrically conductive contacts extend outward from the electrically conductive backbone along a first direction and engage the ceramic component and a second set of the compliant and pressurized electrically conductive contacts extend outward from the electrically conductive backbone along a second direction and engage the grounding structure, wherein the first direction is opposite the second direction.

20. A method, comprising: positioning a contact matrix between a ceramic matrix composite component and a grounding structure, the contact matrix having an electrically conductive backbone and compliant and pressurized electrically conductive contacts extending outward from the electrically conductive backbone; and electrical discharge machining the ceramic matrix composite component while the contact matrix is positioned therebetween so that the compliant and pressurized electrically conductive contacts are biased into pressurized engagement with the ceramic matrix composite component and so that the electrically conductive backbone or at least one of the compliant and pressurized electrically conductive contacts is in electrical conduction to the grounding structure.

What is claimed is:

1. A method, comprising:
electrical discharge machining a ceramic component while a contact matrix is positioned so that electrically conductive contacts of the contact matrix engage the ceramic component and so that an electrically conductive member of the contact matrix is in contact with a grounding structure separate from the ceramic component to provide electrical conduction between the ceramic component and the grounding structure,
wherein the electrically conductive contacts are compliant and pressurized electrically conductive contacts that are biased from a relaxed state into an engaged state in which the electrically conductive contacts undergo deformation into pressurized engagement with the ceramic component.

2. The method of claim 1, wherein the ceramic component is a ceramic matrix composite component.

3. The method of claim 1, wherein the compliant and pressurized electrically conductive contacts are bristles.

4. The method of claim 1, wherein the compliant and pressurized electrically conductive contacts are spring-loaded pins.

5. The method of claim 1, wherein the electrically conductive member of the contact matrix is one or more of the electrically conductive contacts, and wherein the one or more of the electrically conductive contacts engage the grounding structure.

6. The method of claim 1, wherein the electrically conductive contacts are connected to and extend outward from a backbone, and wherein the electrically conductive member of the contact matrix is the backbone.

7. The method of claim 1, wherein a first set of the electrically conductive contacts extend from a backbone and engage the ceramic component.

8. The method of claim 7, wherein the electrically conductive member of the contact matrix is a second set of the electrically conductive contacts, and wherein the second set of the electrically conductive contacts extend from the backbone and engage the grounding structure.

9. The method of claim 8, wherein the first set of the electrically conductive contacts extend from the backbone in a first direction and the second set of the electrically conductive contacts extend from the backbone in a second direction that is opposite the first direction.

10. The method of claim 1, wherein the electrically conductive contacts are coupled with a backbone, and wherein the backbone is flexible.

11. The method of claim 1, wherein the electrically conductive contacts are coupled with a backbone, and wherein the backbone is contoured complementary to the ceramic component.

12. A method, comprising:
positioning a contact matrix between a ceramic matrix composite component and a grounding structure separate from the ceramic matrix composite component, the contact matrix having an electrically conductive backbone and compliant and pressurized electrically conductive contacts extending outward from the electrically conductive backbone; and
electrical discharge machining the ceramic matrix composite component while the contact matrix is positioned therebetween so that the compliant and pressurized electrically conductive contacts are biased from a relaxed state into an engaged state in which the electrically conductive contacts undergo deformation into pressurized engagement with the ceramic matrix composite component and so that the electrically conductive backbone or at least one of the compliant and pressurized electrically conductive contacts is in electrical conduction to the grounding structure.

13. A contact matrix for facilitating electrical grounding of a ceramic component undergoing electrical discharge machining, the contact matrix comprising:
an electrically conductive backbone; and
compliant and pressurized electrically conductive contacts extending outward from the electrically conductive backbone, wherein at least some of the compliant and pressurized electrically conductive contacts are biased from a relaxed state into an engaged state in which the electrically conductive contacts undergo deformation into engagement with the ceramic component so that the at least some of the compliant and pressurized electrically conductive contacts are in electrical conduction to the ceramic component, and
wherein at least one of the electrically conductive backbone and at least one of the compliant and pressurized electrically conductive contacts are in electrical conduction to a grounding structure that is separate from the ceramic component.

14. The contact matrix of claim 13, wherein the compliant and pressurized electrically conductive contacts are bristles.

15. The contact matrix of claim 13, wherein the compliant and pressurized electrically conductive contacts are spring-loaded pins.

16. The contact matrix of claim 13, wherein the ceramic component is a ceramic matrix composite component.

17. The contact matrix of claim 13, wherein the at least one of the compliant and pressurized electrically conductive contacts is in electrical conduction to the grounding structure.

18. The contact matrix of claim 13, wherein the electrically conductive backbone is in electrical conduction to the grounding structure.

19. The contact matrix of claim 13, wherein a first set of the compliant and pressurized electrically conductive contacts extend outward from the electrically conductive backbone along a first direction and engage the ceramic component and a second set of the compliant and pressurized electrically conductive contacts extend outward from the electrically conductive backbone along a second direction and engage the grounding structure, wherein the first direction is opposite the second direction.

* * * * *